United States Patent
Wang et al.

(10) Patent No.: US 9,378,469 B2
(45) Date of Patent: Jun. 28, 2016

(54) OPTIMIZATION OF SYSTEM CONTROL BASED ON SOLVING MULTI-POINT BOUNDARY VALUE PROBLEMS

(75) Inventors: Yebin Wang, Acton, MA (US); Scott A. Bortoff, Brookline, MA (US)

(73) Assignee: Mitsubishi Electric Research Laboratories, Inc., Cambridge, MA (US)

(*) Notice: Subject to any disclaimer, the term of this patent is extended or adjusted under 35 U.S.C. 154(b) by 1127 days.

(21) Appl. No.: 13/434,621

(22) Filed: Mar. 29, 2012

(65) Prior Publication Data

US 2013/0261787 A1 Oct. 3, 2013

(51) Int. Cl.
*G06Q 10/00* (2012.01)
*G06F 17/13* (2006.01)
*G05B 13/00* (2006.01)

(52) U.S. Cl.
CPC ............. *G06Q 10/00* (2013.01); *G05B 13/00* (2013.01); *G06F 17/13* (2013.01)

(58) Field of Classification Search
None
See application file for complete search history.

(56) References Cited

U.S. PATENT DOCUMENTS

| 8,700,190 | B2 * | 4/2014 | Wang | B25J 9/1664 318/587 |
| 8,816,627 | B2 * | 8/2014 | Wang | B25J 9/1664 318/565 |
| 2003/0018400 | A1 * | 1/2003 | Tuttle | B25J 9/1605 700/29 |

OTHER PUBLICATIONS

Allan, Fathi M. and Mohamed Ali Hajji, "Multi-layer parallel shooting method for multi-layer boundary value problems," International Conference on Innovations in Information Technology, 2009.*
Trent, A., Venkataraman, R., and Doman, D., "Trajectory Generation Using a Modified Simple Shooting Method," Proc. of the 2004 IEEE Aerospace Conference, vol. 4, pp. 2723-2729, Mar. 2004.*
Zhang, Weidong, "Improved Implementation of Multiple Shooting for BVPs", 2012.*
R.W. Holsapple, R. Venkataraman, and D. Doman, "New, Fast Numerical Method for Solving Two-Point Boundary-Value Problems," Journal of Guidance, Control, and Dynamics, vol. 27, No. 2, pp. 301-304, 2004.*
Hamilton, Franz, "Parameter Estimation in Differential Equations: A Numerical Study of Shooting Methods", 2011.*

* cited by examiner

*Primary Examiner* — Matthew Sandifer
(74) *Attorney, Agent, or Firm* — Gene Vinokur; James McAleenan; Hironori Tsukamoto

(57) ABSTRACT

An operation of a system is controlled according to a control trajectory represented by a solution of a set of differential equations satisfying boundary conditions, wherein the set of differential equations includes ordered piecewise differential equations. The set of differential equations is parameterized to produce a first set of parameters representing values of the solution at switching times and a second set of parameters representing values of the switching times. The first and the second sets of parameters are determined alternately until the boundary conditions are satisfied to produce the solution; and the control trajectory is generated based on the solution to control the operation of the system.

19 Claims, 16 Drawing Sheets

US 9,378,469 B2

OPTIMIZATION OF SYSTEM CONTROL BASED ON SOLVING MULTI-POINT BOUNDARY VALUE PROBLEMS

FIELD OF THE INVENTION

This invention relates generally to optimization of a control of an operation of a system, and more particularly to determining a control trajectory by solving a multi-boundary value problem.

BACKGROUND OF THE INVENTION

Optimal control problems apply to a wide range of applications such as minimum fuel landing in aerospace, and time optimal operation in manufacturing. As an example, a time optimal motion control system is widely used in positioning applications, e.g., single-axis positioning or multiple-axis positioning. A single-axis positioning motion control system includes a motion controller, a servo amplifier, and a motor. Optimal control of the motion system is generally solved in two steps to reduce a complexity of the design. The first step determines a control trajectory for the motor to control states or control constraints of the motion system, i.e., acceleration, velocity, jerk. The second step designs a controller to ensure that the motor tracks the control trajectory.

The control trajectory can also be determined to reduce the vibration induced by the motion of the motor, as well as other performance metrics, such as positioning time or energy consumption of a specific task. Due to the impact of the control trajectory on the performance of the motion control system, the determination of the control trajectory that optimizes multiple conflicting objectives is difficult.

Dynamic programming and a minimum principle are two main techniques used to solve optimal control problems. The dynamic programming reduces the optimal control problem to a set of partial differential equations; called Hamiltonian-Jacobi-Bellman equations. The minimum principle yields a set of differential equations with conditions on boundary values, i.e., a boundary value problem. The boundary value problem is a set of differential equations together with a set of boundary conditions. A solution to the boundary value problem is a solution to the differential equations which also satisfies the boundary conditions.

Solving a boundary value problem is difficult, and usually resorts to solving an initial value problem (IVP) with guessed initial conditions of the differential equations. The IVP is a set of differential equations together with specified values, called the initial condition, of the unknown function at a given point in the domain of the solution. To solve the boundary value problem using IVP, the initial values are iteratively updated until the trajectory, corresponding to the initial values, satisfies the boundary conditions.

When the operation of the system is subject to state or control constraints, a constrained optimal control problem results in multi-point boundary value problems (MBVPs). A multi-point boundary value problem is a set of ordered piecewise differential equations and corresponding boundary conditions. Typically, the boundary conditions are specified for at least three points in the domain of the solution of the MBVP. MBVPs are one of the most difficult subset of boundary value problems.

The MBVP can take the following form $$\dot{x} = f(x, u, t), \quad t \in [0, T], \quad (1)$$
$$\dot{\lambda} = g(x, \lambda, u, t, \mu, \nu),$$
$$h(x(t_k^-), x(t_k^+), \lambda(t_k^-), \lambda(t_k^+), t_k, \pi, \mu, \nu) = 0, \quad 0 \le k \le m,$$
$$u = \min_u H,$$

where x is a vector of state variables, $\lambda$ is a vector of co-state variables, u is a vector of control variables, H is an appropriately defined Hamiltonian operator, $\mu$, $\nu$, $\pi$ are Lagrange multipliers, m is a constant, $t_0$ and $t_m$ represent the initial and final time respectively, and f, g, H are piecewise functions. To simplify the disclosure, x, $\lambda$, u are called state, co-state, and control variables respectively. The differential equations define how the state and costate variables evolve over time. The algebraic equations specify the value of the state and costate variables at time instants $t_k$, and the control variable as a function of x, $\lambda$, and t. The initial time is $t_0=0$ and the final time is $t_m=T$.

FIG. 1 shows a conventional MBVP 110 that includes a set of ordered differential equations 120, a set of boundary conditions (BCs) 130, and a set of unknown parameters 140 to be identified. Although the parameters are independent of the definition of the MBVP, the parameters are treated as a component of the MBVP for simplification of this description. The boundary conditions are usually in the form of algebraic equations.

FIG. 2 shows an exemplary solution of the MBVP that includes the control trajectory having three segments $AB_1$ 210, $B_1B_2$ 220, and $B_2B$ 230. In FIG. 2, x(t) and $\lambda$(t) represents the trajectories of state and costate variables, $\bar{t}_1$ is the time when the control trajectory switches from the first set of differential equations to the second set of differential equations, and $\bar{t}_2$ is the time when the control trajectory switches from the second set of differential equations to the third set of differential equations. Each segment of the control trajectory satisfies a different set of differential equations, i.e., the MBVP has three sets of differential equations defined over intervals $[0, \bar{t}_1]$, $[\bar{t}_1, \bar{t}_2]$, and $[\bar{t}_2, T]$ respectively: the segment $AB_1$ satisfies the first set of differential equations defined over $[0, \bar{t}_1]$; the segment $B_1B_2$ satisfies the second set of differential equations defined over $[\bar{t}_1, \bar{t}_2]$; and the segment $B_2B$ satisfies the third set of differential equations defined over $[\bar{t}_2, T]$.

Shooting methods, including single and multiple shooting, are classic but effective methods to solve the MBVP as an initial value problem.

Single Shooting Method

FIG. 3 shows the fundamentals of the single shooting method. The curve AB 310 is a true solution of the MBVP to be searched. Since the values of state x(0) and costate $\lambda$(0) at the point A are partially unknown, information about the values of x(T) and $\lambda$(T) at the point B is used to identify the state and costate values at the point A. Given the state and costate values at the point A, the solution of the MBVP is uniquely defined because the MBVP can be solved as an initial value problem.

The method for searching the true state and costate values at the point A is as follows. First, the method estimates an initial position A' 330 of the trajectory, implying the initial value of x(0) and $\lambda$(0). Next, the MBVP is reduced to an initial value problem whose solution, represented by the curve A'B' 320, can be obtained by the integration of the differential equations. The solution of the initial value problem starting with A' ends up with the final position B' 340, which is a distance δF from the expected position B. The shooting error δF is used to update the estimate of the position of A'.

The single shooting method defines parameters at one time instant, usually the costate value at the initial time, and the boundary condition are imposed at another time instant, usually the combination of the state and costate values at the final time. As an example, the MBVP in FIG. 3 has a boundary condition, i.e., δF=0 or the point B' coincides with B. The single shooting has properties such as a small number of parameters, easy implementation, but poor convergence, especially for the cases when the differential equations have nonlinearities or are defined over a large time interval.

The single shooting method also does not make full use of the optimal trajectory implied by the necessary conditions, and thus relies more on the quality of the initial estimate of the unknown parameters. Due to the sensitivity of the boundary conditions with respect to parameters, a solution for the single shooting method only works for a limited class of boundary value problems, for example, the linear boundary value problems, or boundary value problems defined over very short time interval. A usual observation when using a single shooting method to solve an MBVP is the singular gradient issue.

Multiple Shooting Method

Multiple shooting methods address some limitations of the single shooting method, and are generally more accurate, given the initial guess, nonlinearity in the differential equations, and large time intervals, than single shooting methods. The multiple shooting methods ameliorate the poor convergence property of the single shooting method.

FIG. 4 shows the basic idea of the multiple shooting method. The curve AB represents the solution of an MBVP, which includes three segments. The first segment satisfies the first set of differential equations, which are defined over $[0, \bar{t}_1]$. The second segment satisfies the second set of differential equations, which are defined over $[\bar{t}_1, \bar{t}_2]$. The third segment satisfies the third set of differential equations, which are defined over $[\bar{t}_2, T]$. To integrate the piecewise differential equations, multiple shooting methods discretizes the time interval [0,T], for an example, into N subintervals $[t_k, t_{k+1}]$, $0 \le k \le N-1$, with $t_0 = 0$ and $t_N = T$.

As shown in FIG. 4, $A'_0, \ldots, A'_{N-1}$ are the estimated values of the trajectory at time $t_0, \ldots, t_{N-1}$, and $\bar{t}_1, \bar{t}_2$ are estimated switch times, i.e., the parameters are defined as values of the trajectory at points $A'_0, \ldots, A'_{N-1}$ and switch times $\bar{t}_1, \bar{t}_2$. Given the initial values of x and λ at $t_k$, $0 \le k \le N-1$, the differential equations are integrated over $[t_k, t_{k+1}]$, respectively, to obtain the values of x and λ at the next time instant $t_{k+1}$, and the corresponding boundary conditions are $\delta F_k = 0$, for $1 \le k \le N-1$, and δF=0. The multiple shooting method typically defines parameters and boundary conditions at the discretized time instants $t_k$, $1 \le k \le N-1$ and the time instants when the control trajectory switches, e.g., $\bar{t}_1, \bar{t}_2$.

In contrast with the single shooting method, the multiple shooting method performs integration over a much shorter time interval $[t_k, t_{k+1}]$, and the gradient of the boundary conditions, with respect to estimated parameters, can be approximated much accurately by sensitivity equations. The multiple shooting method has better convergence property than the single shooting methods. However, this improvement is achieved at the expenses of introducing additional parameters, which decreases the computation efficiency. The multiple shooting method can also handle a state constrained optimal control problem. However, the multiple shooting method transforms the MBVP into a large nonlinear programming problem, and the corresponding solver is computationally complex. Thus, the multiple shooting method cannot always meet a target completion time for high speed industrial applications, e.g., trajectory planning for motion control systems.

FIG. 5 shows a block diagram of a conventional iterative procedure for solving the MBVP for given parameters and boundary conditions. The parameters are initially estimated 510 and based on the initial estimate of parameters, the MBVP is solved 520 as an initial value problem of differential equations. The solution is tested 530 against the boundary conditions. The parameters are updated 550 if the boundary conditions are not satisfied, otherwise, the method outputs 540 the control trajectory.

SUMMARY OF THE INVENTION

It is an object of various embodiments of an invention to provide a method for controlling an operation of a system such that a cost of the operation is optimized. Typically, the cost of the operation is subject to various constraints of the operation, such as dynamic constraints, acceleration and velocity constraints. The optimization of the operation of the system is formulated as an open loop optimal control problem, which is further reduced to a solution of a multi-boundary value problem (MBVP) corresponding to a control trajectory optimizing the cost function subject to the constraints.

Some embodiments disclose a mixed shooting method to reduce processing time for the solution of the MBVP. In one embodiment, the method is applied to design a control trajectory for an energy efficient motion control system, which consumes the minimal energy while carrying out a specific positioning task.

The mixed shooting method according to some embodiments of the invention is based on a realization that parameters and boundary conditions of the MBVP have various types with respect to, e.g., a structure of the MBVP. Thus, the parameters and the boundary conditions can be partitioned into two or more sets and each set can be separately determined. For example, each set can be determined iteratively and alternately based on values of another set fixed for a current iteration. For example, a first set of parameters is updated until the first set of boundary conditions is satisfied, then a second set of parameters is adjusted to satisfy the second set of boundary conditions.

For example, in one embodiment, the first set of parameters include state and costate values of a motion system at certain time instants, and the second set of parameters includes switch times of differential equations.

The mixed shooting method overcomes the convergence issue of the conventional methods remarkably because of sensitivity of boundary conditions with respect to the switch times, and the coupling effects of the state and costate values, and switch times on the boundary conditions. The mixed shooting method reduces the number of parameters to optimize processing time, and to improve the convergence property by incorporating the structure of the optimal trajectory as a priori condition.

Some embodiments of the invention are motivated by the need of an effective trade-off between energy consumption and productivity of the motion control system, such that the overall cost of the operations of the motion control system is reduced. Among various factors, an energy efficient trajectory that a servo motor follows to reduce the energy consumption of the motion control system is determined. Furthermore, the energy efficient trajectory considers various constraints of the motion control system including velocity, acceleration, and current constraints. Various embodiments of the invention determine the energy efficient trajectory of the energy efficient motion control system as an optimal control problem, which can be formulated as a class of the MBVPs, and solve the MBVPs using the mixed shooting method.

Accordingly, one embodiment of the invention discloses a method for controlling an operation of a system according to a control trajectory represented by a solution of a set of differential equations satisfying boundary conditions, wherein the set of differential equations includes ordered piecewise differential equations. The method includes parameterizing the set of differential equations to produce a first set of parameters representing values of the solution at switching times and a second set of parameters representing values of the switching times; determining alternately the first and the second sets of parameters until the boundary conditions are satisfied to produce the solution; and generating the control trajectory based on the solution to control the operation of the system, wherein steps of the method are performed by a processor.

For example, in one variation of this embodiment the system is a motion control system including a motor, wherein the operation of the system is subject to constraints, wherein the values of the first set of parameters represent state and costate of the system, and wherein the set of differential equations and the boundary conditions form a multi-boundary value problem (MBVP) having the solution satisfying the constraints and optimizing a cost function representing energy consumption of the system during the operation.

Another embodiment of the invention discloses a method for solving a multi-boundary value problem (MBVP) formed by a set of differential equations satisfying boundary conditions, wherein the set of differential equations includes ordered piecewise differential equations, and wherein a solution of the MBVP represents a control trajectory. The method includes parameterizing the set of differential equations to produce a first set of parameters representing values of the solution at switching times and a second set of parameters representing values of the switching times; determining values of the first set of parameters satisfying a first set of boundary conditions by solving the set of differential equations having the values of the second set of parameters fixed; determining the values of the second set of parameters satisfying a second set of boundary conditions by solving the set of differential equations having the values of the first set of parameters fixed; and repeating the determining values of the first and the second set of parameters until both the first and the second sets of boundary conditions are satisfied, wherein steps of the method are performed by a processor.

Yet another embodiment discloses a motion controller for controlling a system based on a control signal. The motion controller includes a processor configured to execute a trajectory generation module and a control module, wherein the trajectory generation module determines a control trajectory by solving a multi-boundary value problem (MBVP) using a mixed shooting method; and the control module generates the control signal based on the control trajectory.

DETAILED DESCRIPTION OF THE PREFERRED EMBODIMENTS

Figure 1:
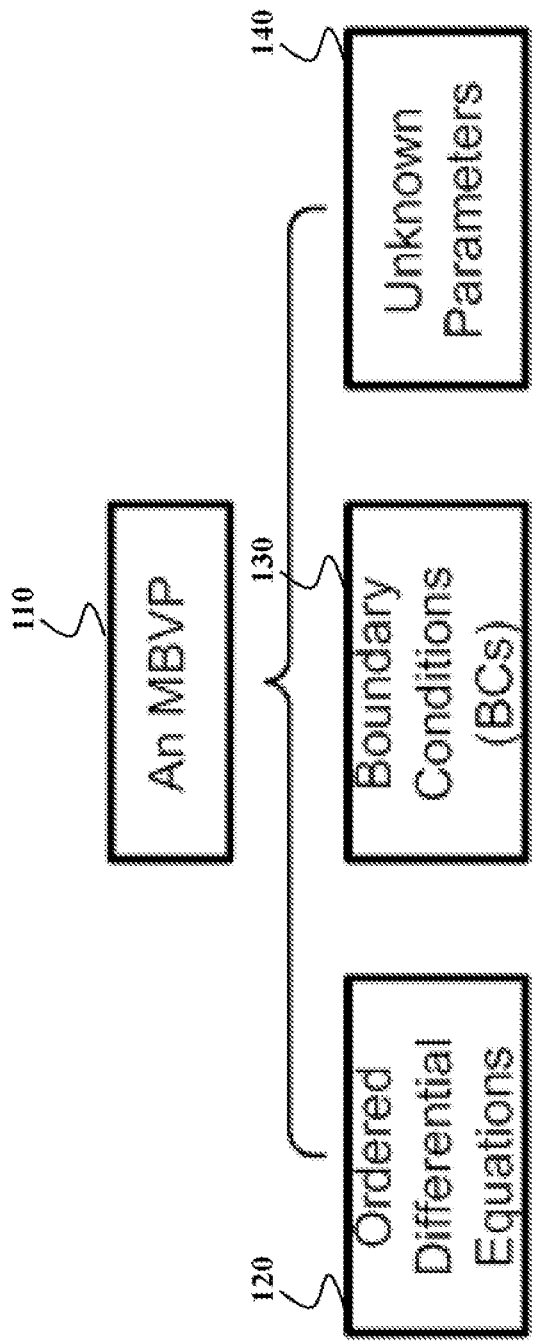
FIG. 1 is a block diagram of a prior art multi-boundary value problem (MBVP)
Figure 2:
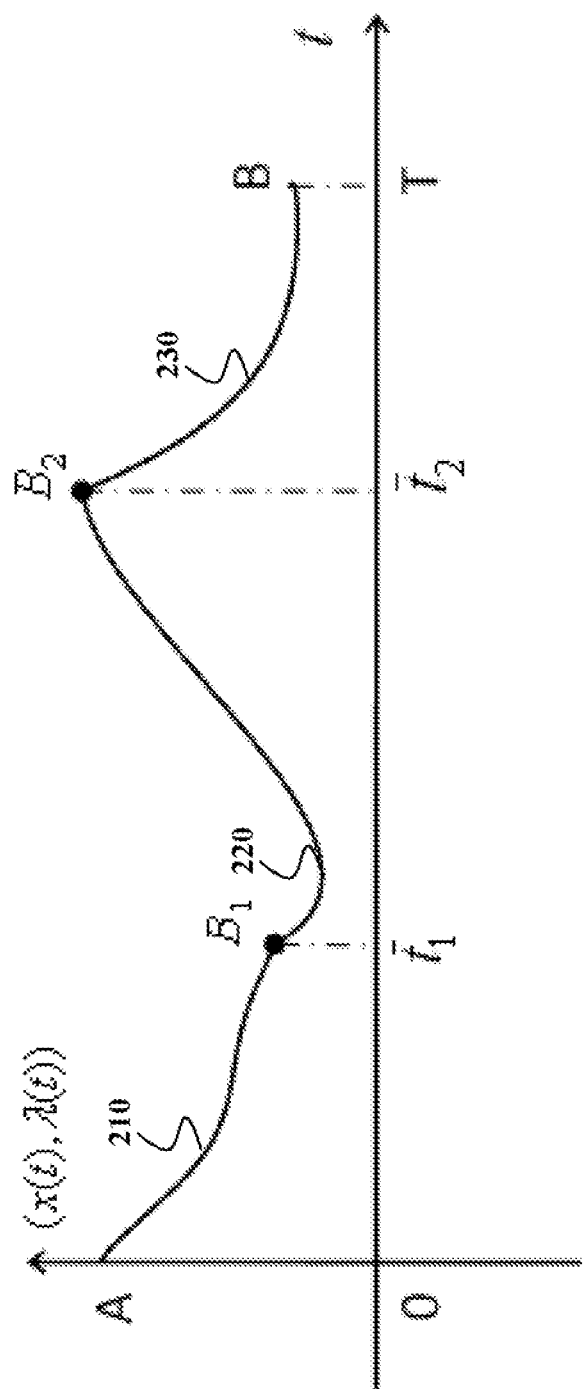
FIG. 2 is a graph a prior art piecewise solution of an MBVP.
Figure 3:
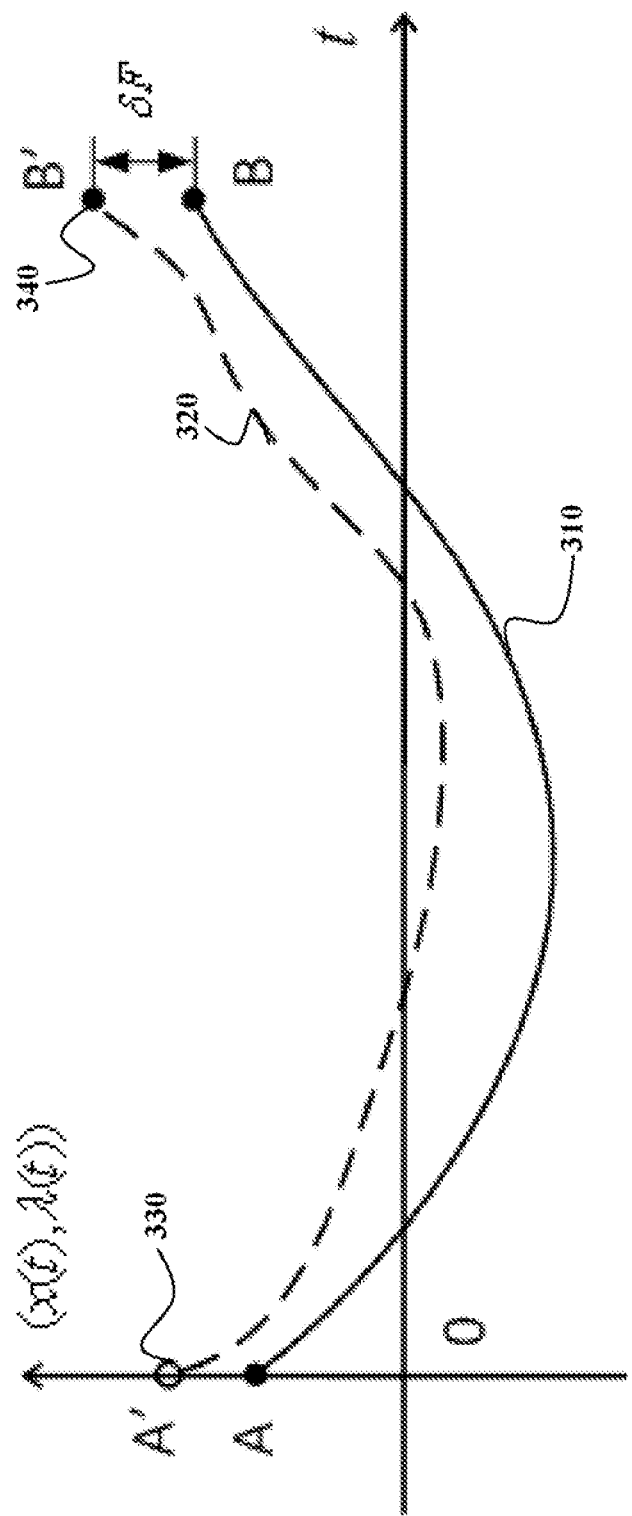
FIG. 3 is a graph of a prior art a single shooting method to solve an MBVP.
Figure 4:
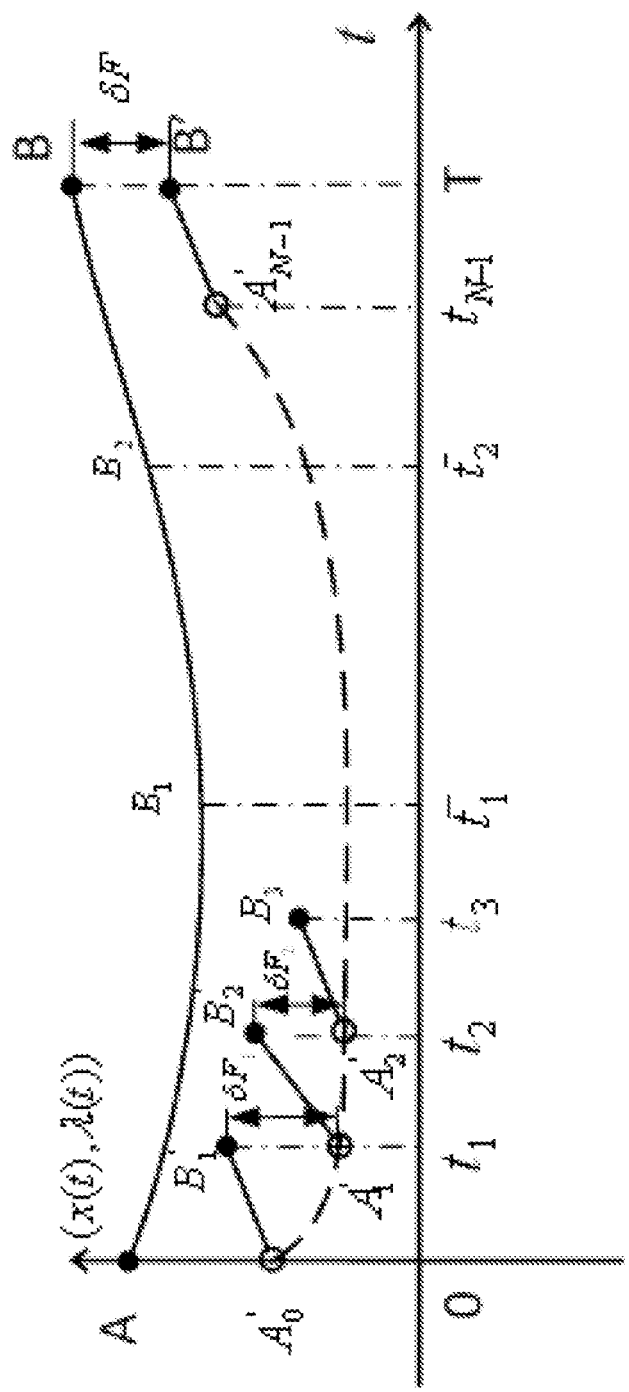
FIG. 4 is a graph of a prior art multiple shooting method to solve an MBVP.
Figure 5:
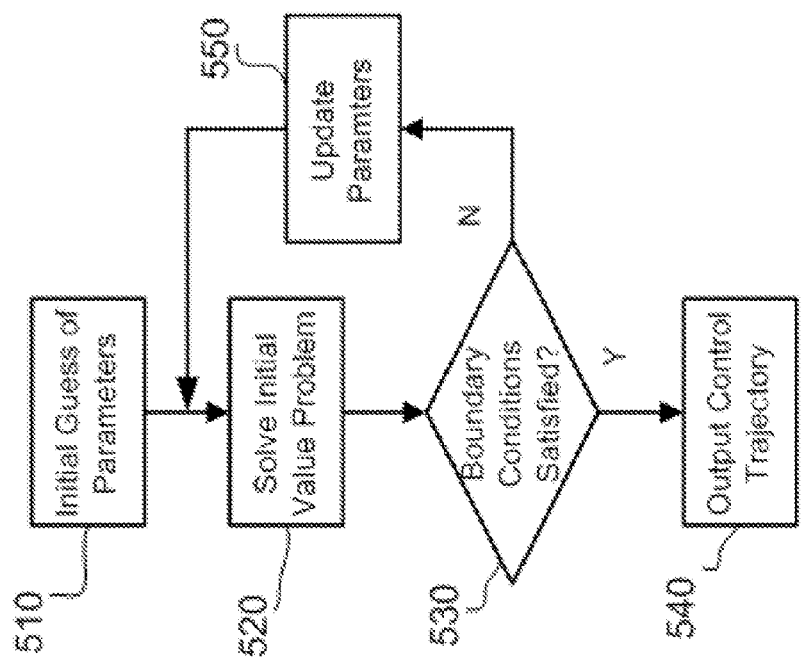
FIG. 5 is a flow chart of a prior art shooting methods to search the solution of the MBVP.
Figure 6A:
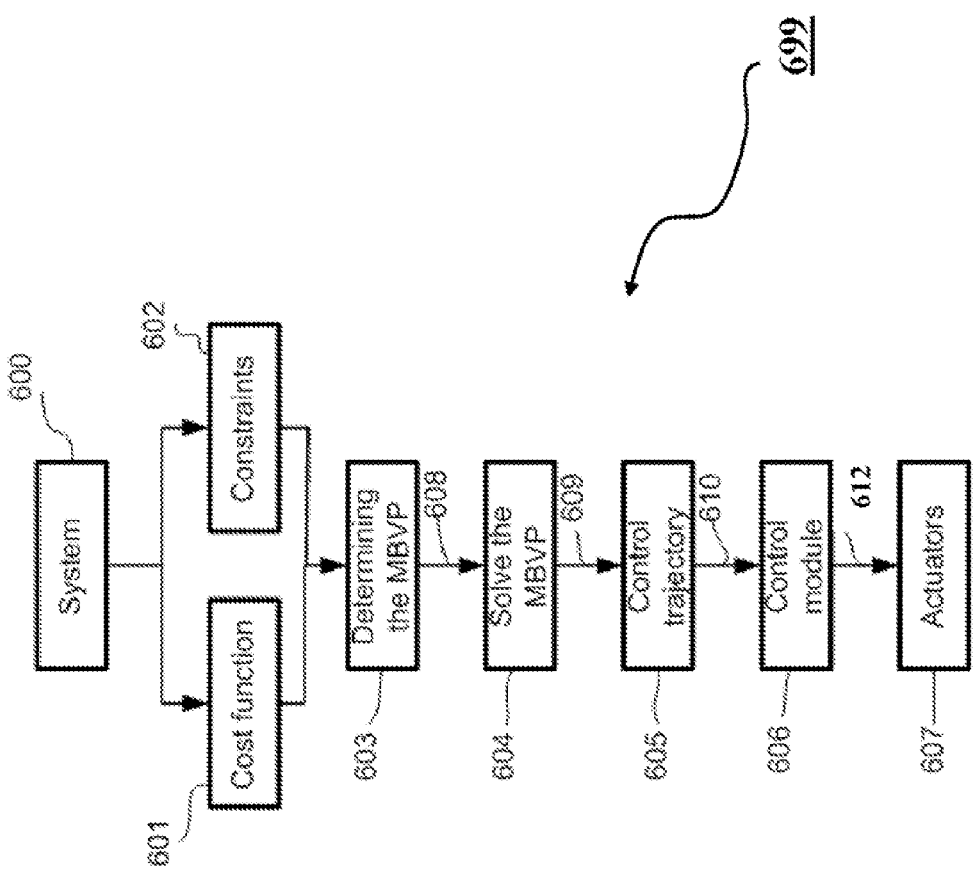
FIGS. 6A-B are block diagrams of a method and a control system for controlling an operation of a system according to some embodiments of an invention.

FIG. 6A shows a method for controlling an operation of a system according to some embodiments of the invention. The method of FIG. 6A is used for illustration purpose only, and is not intended to limit the scope of the invention.

Steps of the method can be executed by a processor 699. An operational cost of the system 600 is represented by a cost function 601, and a physical structure and limitations of the system, and details about a specific task of the system are represented by constraints 602 of the operation. The constraints 602 include but not limited to dynamic constraints representing a model of the system, state and control constraints, execution time and distance of the task.

In one embodiment, the state constraint includes at least one of acceleration and velocity constraints. Based on the cost function 601 and the constraints 602, a multi-boundary value problem (MBVP) is determined 603, such that a solution of the MBVP produces the control trajectory optimizing the cost function 601, while satisfying the constraints 602.

The MBVP is solved 604 using a mixed shooting method to produce a solution 609. The mixed shooting method is described in more details below. The solution can be optionally processed 605, e.g., using a low-pass filter to remove high frequency components of the solution, to generate a control trajectory 610.

In one embodiment, a system that implements at least part of the method of FIG. 6A is a motion control system including a motor, wherein the operation of the system is subject to constraints, wherein the values of the first set of parameters represent state and costate of the system, and wherein the set of differential equations and the boundary conditions form a multi-boundary value problem (MBVP) having the solution satisfying the constraints and optimizing a cost function.

As an example, in the motion control system, the control trajectory 610 can include one or combination of acceleration, velocity, and position trajectories of motors. The control module 606 generates the control signal 612 based on the control trajectory 610 and outputs the control signal to actuators 607 of the system thus controlling the optimal operation of the system.

Figure 6B:
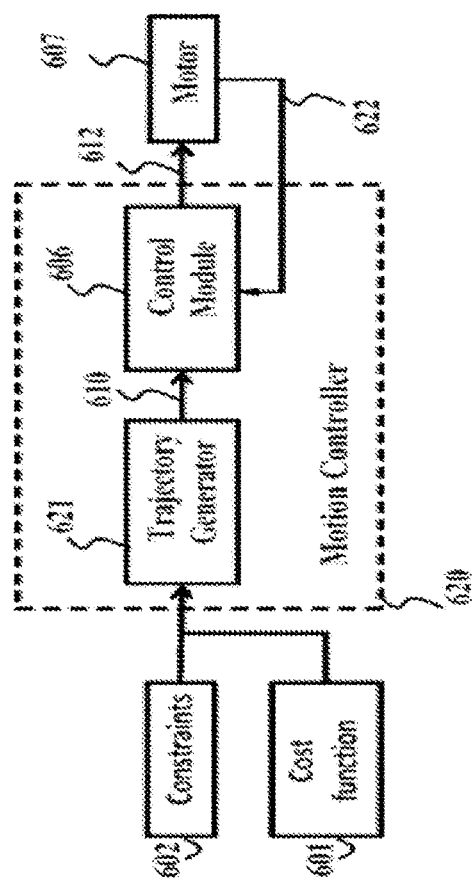

FIG. 6B shows an example of a motion controller 620 implementing at least part of the method of FIG. 6A. For example, a trajectory generator module 621 determines the MBVP corresponding to the control trajectory optimizing the cost function subject to the constraints of the operation of the system, and solves the MBVP using the mixed shooting method to produce the control trajectory 610. In one variation of this embodiment, the trajectory generator module 621 performs functions of the blocks 603, 604, and 605. The control module 606 controls the system using the control trajectory, e.g., by generating the control signal 612 based on a feedback signal 622, and the control trajectory 610.

In one embodiment, the cost function represents the energy consumption of the system during the operation. For example, the cost function can be an integral $$E = \int_0^T \max(0, P(x(t), u(t)) dt,$$

wherein E is the energy consumption of the system during time of the operation T, $P(x, u)$ is an instantaneous energy consumption of the system, x is a state of the motor, u is a control input to the motor, wherein the instantaneous energy consumption P results from at least one of a copper loss of the resistance windings of the motor, a switching loss of an amplifier, and a mechanical work of the motor.

Determining MBVP

Figure 7:
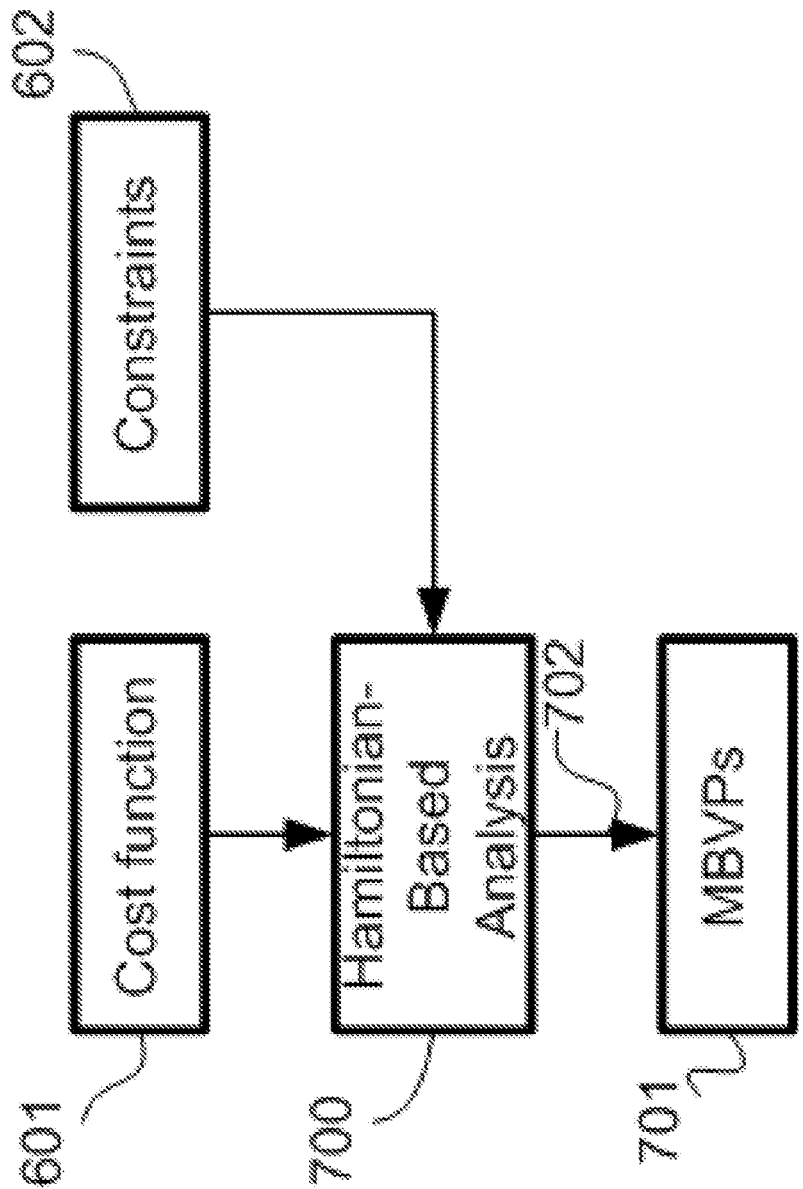
FIG. 7 is a block diagram of a method for determining the MBVPs according to some embodiments of an invention.

FIG. 7 shows a method for determining a set of MBVPs based on Hamiltonian analysis 700 according to some embodiments of the invention. The Hamiltonian analysis 700 produces necessary conditions 702 that the optimal control trajectory has to satisfy for the cost function 601 and the constraints 602. The necessary conditions 702 can be further reduced to a combination of a set of piecewise differential and algebraic equations according, e.g., to Equation (1). Based on the necessary conditions 702 and feasible orders of differential equations, the block 701 establishes a set of MBVPs.

The order of the differential equations, defined over time intervals, is equivalent to a structure of the solution of the MBVP. As used herein, the structure of the MBVP defines an order of various types of differential equations. Switch times indicate switching from one type of differential equations to another. Typically, one type of differential equations corresponds to one segment of the control trajectory. Examples of the types of the differential equations include, but not limited to, acceleration or deceleration constrained type, a velocity constrained type, a zero power type, an unconstrained type of the differential equations.

Due to the presence of constraints, the control trajectory satisfying the necessary conditions includes one or more segments. Each segment of the control trajectory may satisfy different set of differential equations and boundary conditions. The control trajectories corresponding to different constraints may comprise of different segments. For example, for one problem data, one constraint is not active along the optimal control trajectory; on the other hand, for another problem data, the same constraint is active along the optimal control trajectory. Hence, the necessary conditions in general result in a set of MBVPs 701 corresponding to various types of control trajectories having distinctive structures. As an example, MBVPs 701 can include M MBVPs, and each MBVP corresponds to a class of control trajectories having a particular structure.

For example, one embodiment controls a particular class of motion control systems, where the model of the servo motor is $$\dot{x} \begin{bmatrix} 0 & 1 \\ 0 & d \end{bmatrix} x + \begin{bmatrix} 0 \\ b \end{bmatrix} u + \begin{bmatrix} 0 \\ c \end{bmatrix} = Ax + Bu + C, \quad (2)$$

where $x=(x_1,x_2)^T=(\theta,\omega)^T$ is a state of the motor representing a position and angular velocity of the motor, respectively, d is a viscous friction coefficient, c is a Coulomb friction, u is a control input (current) to the servo motor, a single dot indicates the first derivative, and double dots the second derivative. The control input to the motor depends on the type of the motor. In one embodiment, the control input to the motor includes a current input into the motor. Additionally or alternatively, the control input can include control signal of a voltage into the motor.

For example, the operational cost of the motion control system is the cost of power, i.e., the energy consumed. Thus, one embodiment determines the control trajectory such that the energy consumption of the motion control system is minimized. The gross energy consumption of the motion control system performing a point to point tracking task within a time interval is abstracted by the following cost function $$E = \int_0^T (Ru^2 + K_s|u| + K_\tau x_2 u) dt, \quad (3)$$

where T is the execution time of the task and is usually specified by users, R is a resistance of windings of the motor and, $K_s$ is a constant coefficient of the switching loss due to the switch of the amplifier, $K_\tau$ is a torque constant of the motor. The cost function in Equation (3) represents the energy consumption for a large class of motion control systems by including the copper loss $Ru^2$, amplifier loss $K_s|u|$, and mechanical work $K_\tau x_2 u$.

The motion control system can also includes various constraints: dynamic constraint is described by Equation (2), the constraint on the angular acceleration of the motor is described by $|\dot{x}_2| \leq \alpha_{max}$ with $\alpha_{max}$ a positive constant, the constraint on the angular velocity of the motor is described by $0 \leq x_2 \leq v_{max}$ with $v_{max}$ a positive constant, the constraint on the initial position of the motor $x(0)=(0,0)$, the constraint on the final position of the motor $x(T)=(r,0)$, and the execution time of the task T. The consideration of the constraints in the trajectory generation can remove the limitations introduced by absence of the constraints in the design stage, thus improve the energy efficiency of the motion control system.

Given the cost function and constraints, the piecewise Hamiltonian operator H is $$H = \begin{cases} H_{11} = Ru^2 + K_s u + K_\tau x_2 u + \overline{H}_1, & u \geq 0, \\ H_{12} = Ru^2 - K_s u + K_\tau x_2 u + \overline{H}_1, & u < 0, \end{cases} \quad (4)$$

where $$\overline{H}_1 = \lambda^T(Ax + Bu + C) + \mu^T \begin{bmatrix} dx_2 + c + bu \\ -dx_2 - c - bu \end{bmatrix} + v^T \begin{bmatrix} dx_2 + c + bu - a_{max} \\ -a_{max} - dx_2 - c - bu \end{bmatrix}.$$

The Lagrange multiplier $\lambda$ is also called the costate variable and corresponds to the dynamic constraint. The Lagrange multipliers $\mu$, $\nu$ correspond to the velocity and acceleration constraints, respectively.

Block 700 determines the control on constrained segments by minimizing the Hamiltonian operator $$u_c = \begin{cases} -\dfrac{dx_2 + c}{b}, & x_2 = v_{max}, \\ \dfrac{a_{max} - dx_2 - c}{b}, & \dot{x}_2 = a_{max}, \\ \dfrac{-a_{max} - dx_2 - c}{b}, & \dot{x}_2 = -a_{max}. \end{cases} \quad (5)$$

The unconstrained positive and negative controls can be determined by minimizing the Hamiltonian, equivalently from a $\partial H_{11}/\partial u=0, \partial H_{12}/\partial u=0$ $$u = \begin{cases} -\dfrac{K_\tau x_2 + K_s + b\lambda_2}{2R}, & u \geq 0, \\ -\dfrac{K_\tau x_2 - K_s + b\lambda_2}{2R}, & u < 0. \end{cases} \quad (6)$$

Given the state x and the costate $\lambda$, the control signal u and the x-dynamics are well-defined. Since the partial derivative of H w.r.t. x is well-defined, the costate dynamics is $$\dot{\lambda} = -A^T \lambda - \begin{bmatrix} 0 \\ K_\tau u \end{bmatrix} - \begin{bmatrix} 0 & 0 \\ d & -d \end{bmatrix}(\mu + \nu). \quad (7)$$

Block 700 further determines the values of the Lagrange multipliers $\mu, \nu$ along the trajectory to derive the differential equations defining the evolution of the costate over time. When the control trajectory is along unconstrained segments, $\mu=\nu=0$.

If an acceleration constraint is active, then $\nu$ is solved by $$H_{11u}|_{u=u_{pacc}} = 0, \dot{x}_2 - \alpha_{max} \leq 0 \text{ is active}, \quad (8)$$

$$H_{12u}|_{u=u_{nacc}} = 0, -\alpha_{max} - \dot{x}_2 \leq 0 \text{ is active}, \quad (9)$$

whose solutions are $$\nu_1 = \frac{-1}{b}\{2Ru + K_s + K_\tau x_2 + b\lambda_2\}, \quad (10)$$

$$\nu_2 = \frac{1}{b}\{2Ru - K_s + K_\tau x_2 + b\lambda_2\}.$$

For the velocity constraint $x_2 - v_{max} \leq 0$, the Lagrange multiplier $\mu$ is determined from $H_{11u}=0$ with $u=u_{pvel}$ $$\mu_1 = \frac{-1}{b}\{2Ru + K_s + K_\tau x_2 + b\lambda_2\}, \quad (11)$$

$$x_2 = v_{max}.$$

Block 700 further determines the necessary conditions that the control trajectory has to satisfy at the initial and final times of the task, and at the time instants $t_k$, $1 \leq k \leq m-1$ when the control trajectory switches. Necessary conditions of the control trajectory at the initial and final time are $$x(0)=(0,0), x(T)=(r,0), \quad (12)$$

at the time instant $t_k$ when the switch time where trajectory switches is $$u(t_k^-) = u(t_k^+), \quad (13)$$

$$x(t_k^-) = x(t_k^+),$$

$$\lambda(t_k^-) =$$

$$\begin{cases} \lambda(t_k^+), & \text{if } x_2(t) \neq v_{max} \text{ over } [t_k, t_{k+1}], \\ \lambda(t_k^+) - (0, \pi)^T, x(t_k^-) = v_{max}, & \text{otherwise.} \end{cases}$$

Block 700 finally derives the necessary conditions 702 including according Equations (4)-(13).

Given the necessary conditions in Equations (4)-(13), block 701 determines the set of MBVPs. For example, the Equations (4)-(13) can be rearranged to the form of Equation (1). Because the control variable u and the Lagrange multipliers $\mu, \nu$ are defined, and the costate dynamics are derived, the differential Equations (1) is established.

Necessary conditions of Equations (12)-(13) also fit the form $$h(x(t_k^-), x(t_k^+), \lambda(t_k^-), \lambda(t_k^+), t_k, \pi, \mu, \nu) = 0$$

By analyzing the necessary conditions, the block 701 determines the control trajectory that can include various segments: the unconstrained positive control segment ($U^+$) where the control is unconstrained and positive, the unconstrained negative control segment ($U^-$) where the control is unconstrained and negative, the zero control segment ($U^0$) where the control takes zero, the positive acceleration constrained control segment ($A^+$) where the positive acceleration constraint is active, the negative acceleration constrained control segment ($A^-$) where the negative acceleration constraint is active, and the velocity constrained control segment ($V^+$) where the maximum velocity constraint is active.

Given the identification of types of segments, block 701 further analyzes the necessary conditions and derives the set of MBVPs, which can include one or combination of the MBVP corresponding to the control trajectory including unconstrained positive control segment, zero control segment, and unconstrained negative control segment; the MBVP corresponding to the control trajectory including positive acceleration constrained segment, unconstrained positive control segment, zero control segment, and unconstrained negative control segment; the MBVP corresponding to the control trajectory including positive acceleration constrained segment, unconstrained positive control segment, zero control segment, unconstrained negative control segment, and negative acceleration constrained segment sequentially; the MBVP corresponding to the control trajectory including unconstrained positive control segment, velocity constrained segment, unconstrained positive control segment, zero control segment, and unconstrained negative control segment; the MBVP corresponding to the control trajectory including positive acceleration constrained segment, unconstrained positive control segment, velocity constrained segment, unconstrained positive control segment, zero control segment, and unconstrained negative control segment; the MBVP corresponding to the control trajectory including positive acceleration constrained segment, unconstrained positive control segment, velocity constrained segment, unconstrained positive control segment, zero control segment, unconstrained negative control segment, and negative acceleration constrained segment.

Figure 8:
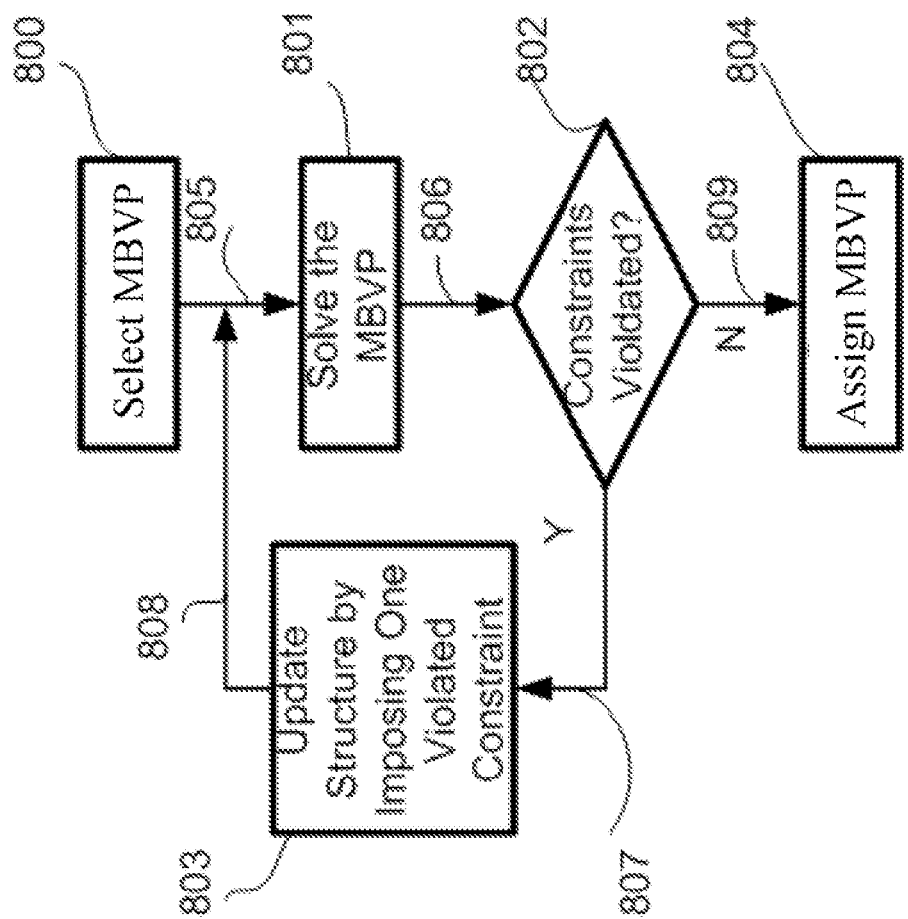
FIG. 8 is a block diagram of a method for determining a structure of the MBVP according to some embodiments of an invention.

FIG. 8 is a block diagram of a method for determining the MBVP according to one embodiment, such that a solution of the MBVP is the control trajectory optimizing the cost function subject to constraints. The MBVP 805 is selected 800 from the set of MBVPs 701 determined based on a Hamiltonian analysis of the cost function and constraints of the operation of the system, as shown in FIG. 7. Typically, an order of the selecting the MBVP is based on a complexity of a structure of the MBVP. For example, an initial structure of the control trajectory can be selected as the simplest structure among all possible structures of the MBVPs 701. The MBVP 805 with is solved 801 to produce a solution 806. A block 802 verifies whether the solution 806 of the MBVP violates any constraints 807. The solution of the MBVP is assigned to represent the control trajectory, if the solution satisfies the constraints.

If any constraint is violated, the selecting of the MBVP is repeated. For example, the structure of the MBVP is updated 803 by, e.g., adding constrained segments corresponding to one of violated constraints 807 to the current structure of the MBVP to produce a new structure 808 of the selected MBVP for the next iteration. Otherwise, if no constraints are violated 809, the iterations are stopped and the solution of the MBVP is assigned 804 to represent the control trajectory.

This embodiment is advantageous, because MBVP is solved for boundary conditions. The control trajectory represented by the MBVP naturally satisfies the boundary conditions, but still can violate constrains in other points in the domain of the solution. Thus, this embodiment ensures that the control trajectory with simplest structure satisfied both boundary conditions and the constraints.

Mixed Shooting Method

A mixed shooting method is a method for solving the MBVP based on parameterization of the set of differential equations into a first set of parameters representing values of the solution at switching times and a second set of parameters representing values of the switching times. In one embodiment, the values of the solution include state and costate values of a motion system. The MBVP can be represented by ordered piecewise differential equations, and the switching times can represent a change in the structure of the MBVP, i.e., switching, e.g., according to the order, from one set of differentiation equations corresponding to one segment of the control trajectory to another set of differentiation equations corresponding to another segment of the control trajectory.

The mixed shooting method determines alternately the values of the first and the second sets of parameters until the set of boundary conditions are satisfied. The mixed shooting method overcomes the convergence issue of the conventional methods remarkably because of the sensitivity of boundary conditions with respect to the switching times, and the coupling effects of the state and costate values, and switching times on the boundary conditions. The mixed shooting method reduces the number of parameters to optimize processing time, and to improve the convergence property. Various combinations of steps of the mixed shooting method are described in more details below.

Figure 9:
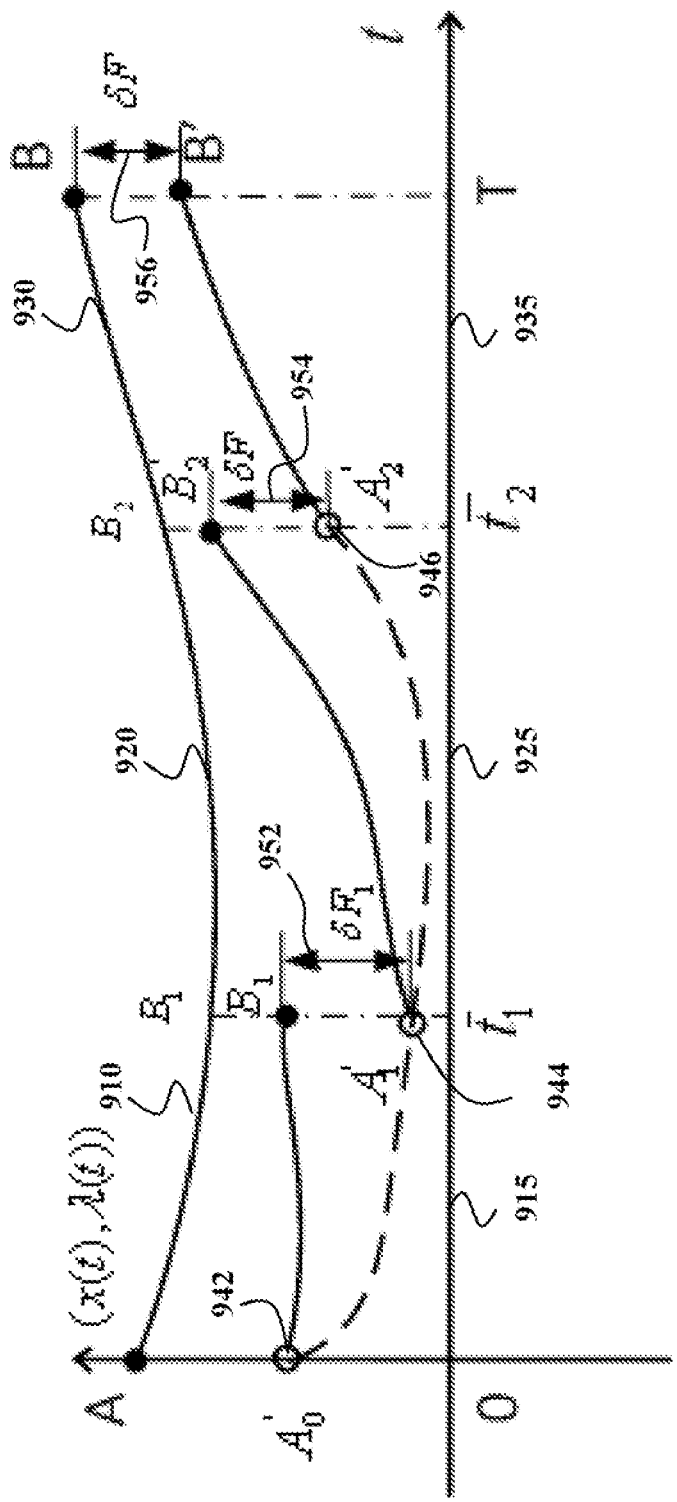
FIG. 9 is a graph of a mixed shooting method for solving the MBVP according to some embodiments of an invention.

FIG. 9 shows an example of a solution of the MBVP represented by a curve AB. The curve AB includes three segments $AB_1$ 910, $B_1B_2$ 920, and $B_2B$ 930. The first set of differential equations of a first type, defined over a period $[0, \bar{t}_1]$ 915, corresponds to the segment $AB_1$, the second set of differential equations of a second type, defined over a period $[\bar{t}_1, \bar{t}_2]$ 925, corresponds to the segment $B_1B_2$, and the third set of differential equations of a third type, defined over a period $[\bar{t}_2, T]$ 935, corresponds to the segment $B_2B$. Accordingly, the differential equations of first, second and third type are ordered piecewise differential equations, and together with the corresponding boundary conditions form the MBVP. The solution to the MBVP represents the control trajectory, shown in this example as the curve AB.

In some embodiments, the mixed shooting method parameterizes the set of differential equations to produce a first set of parameters representing values of the solution at switching times and a second set of parameters representing values of the switching times. For example, in the example of FIG. 9, the parameterization defines the first set of parameters as the values of the solution, e.g., state and costate at positions 942, 944, and 946, i.e., the positions $A'_0$, $A'_1$, $A'_2$ and defines the second set of parameters as values of the switch times $\bar{t}_1, \bar{t}_2$.

Similarly, the boundary conditions can also be partitioned into the first set of boundary conditions corresponding to the first set of parameters and the second set of boundary conditions corresponding to the second set of parameters. For example, the boundary conditions for the switch times $\bar{t}_1$ and $\bar{t}_2$ can be defined as errors 952, 954, and 956, i.e., the errors $\delta F_1, \delta F_2, \delta F_3$. For example, in one embodiment, the first set of boundary conditions is determined based on continuity of the state and costate of the system at the switching times.

The parameterizations of the set of differential equations according to various embodiments allows a fast computation of the solution of the MBVP compared to conventional multiple shooting methods due to reducing the number of used parameters. Also, the parameterization improves the convergence property by exploring the knowledge of the structure of the solution to solve the differential equations over shorter time intervals.

Figure 10A:
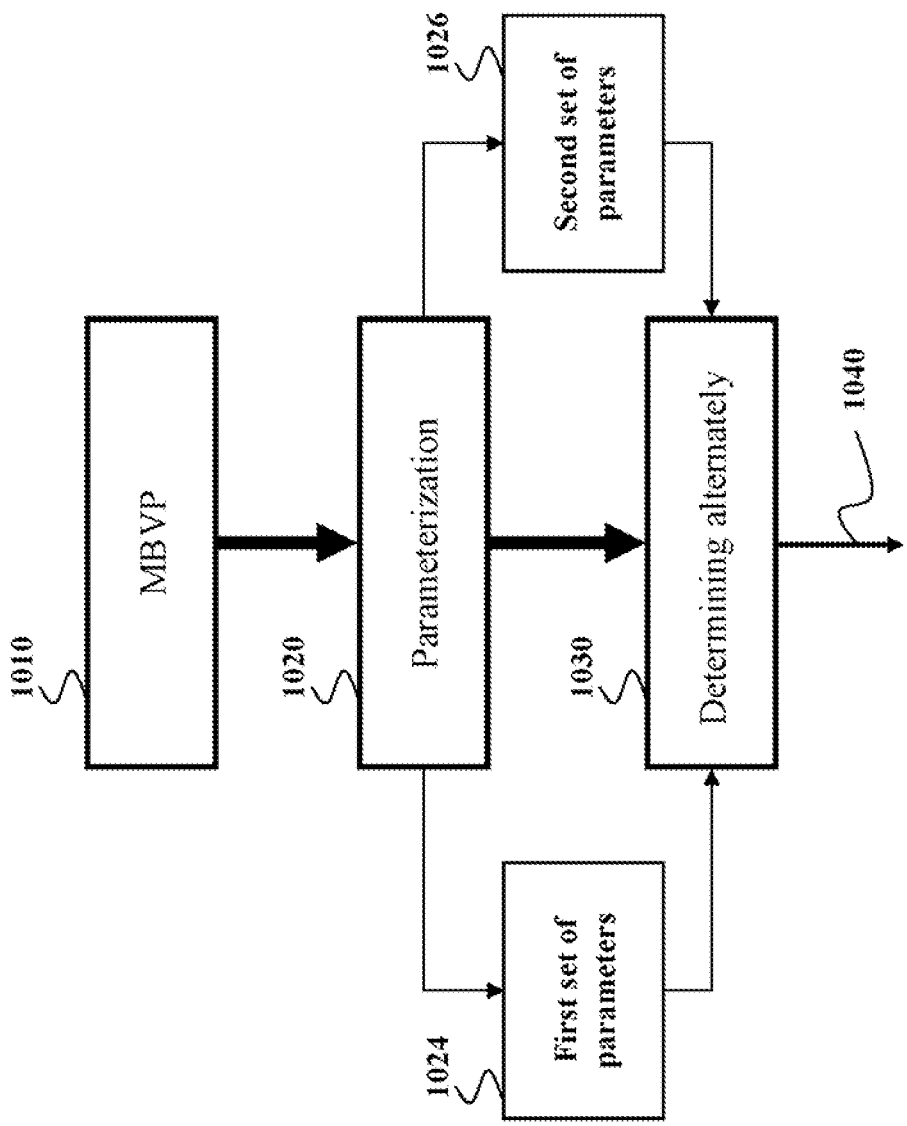
FIG. 10A is a block diagram of the mixed shooting method according to some embodiments of an invention.

FIG. 10A shows a block diagram of the mixed shooting method. Given an MBVP 1010, its parameterization is accomplished in 1020, where the solution of the MBVP is parameterized by initial conditions of ordered piecewise differential equations and the switching times. The switching times specify the time intervals over which different sets of differential equations are defined. Given values of a set of chosen parameters, the solution of the MBVP, or the solution to the ordered differential equations, can be computed uniquely. The set of parameters is further partitioned into a first set of parameters 1024, and a second set of parameters 1025. Given the parameterized MBVP and the partition, the solution of the MBVP is solved alternately in 1030. The partition of the set of parameters allows the two sets of parameters to be updated alternately, and improve the convergence property of the algorithm to solve the MBVP to produce, e.g., a control trajectory 1040.

Figure 10B:
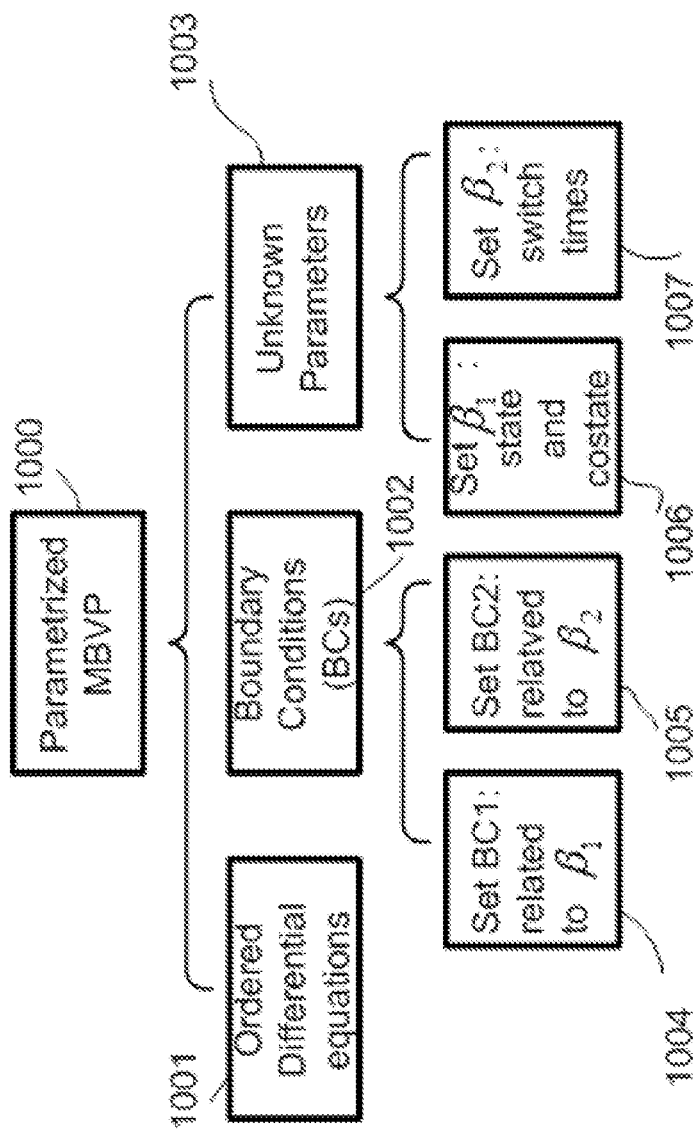
FIG. 10B is a schematic of partitioning boundary conditions and parameters of the MBVP according to some embodiments of an invention.

FIG. 10B shows an example of partitioning the parameters and the boundary conditions into at least two sets. For example, the parameters can be partitioned into a first set of parameters and a second set of parameters, and the boundary conditions can be partitioned into a first set of boundary conditions corresponding to the first set of parameters and a second set of boundary conditions corresponding to the second set of parameters.

For example, a parameterized MBVP 1000 is represented by ordered differential equations 1001, boundary conditions 1002, and unknown parameters 1003. The boundary conditions 1001 are partitioned into the first set of boundary conditions $BC_1$ 1004, and the second set of boundary conditions $BC_2$ 1005. The parameters 1003 are partitioned into two different sets, i.e., the first set of parameters $\beta_1$ 1006, and the second set of parameters $\beta_2$ 1007.

In the embodiment shown in FIG. 9, the first set of parameters $\beta_1$ includes values of the control trajectory at time instants, and the second set of parameters $\beta_2$ includes the variable of the structure of the control trajectory. Typically, the first set of parameters includes the values of the state and costate of the system and the second set of parameters comprises the switching times of the differential equations.

In various embodiments of the invention, the first and the second sets of parameters are determined alternately until the first set and the second set of boundary conditions are satisfied. For example, the parameters can be determined recursively, where, for each iteration, the first set of parameters is determined based on fixed values of the second set of parameters, and the second set of parameters is determined based on fixed values of the first set of parameters.

Figure 11:
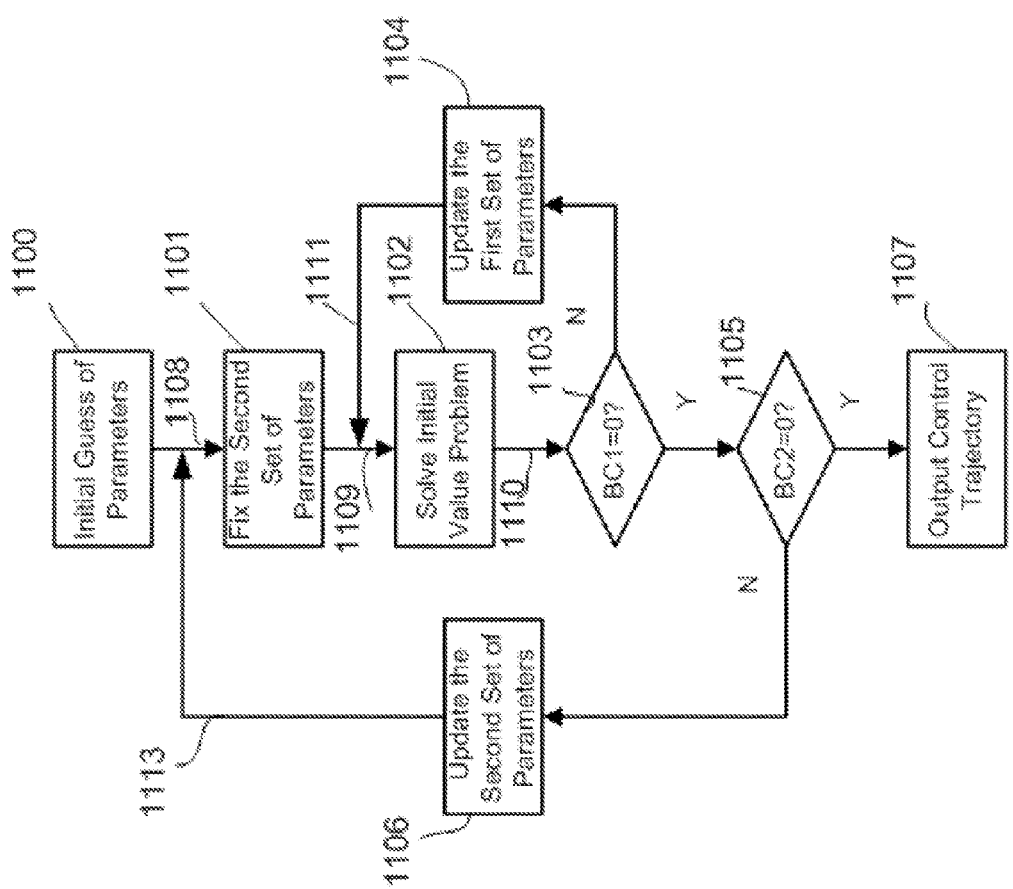
FIG. 11 is a block diagram of a two-step recursion for solving the MBVP according to some embodiments of an invention.

FIG. 11 shows a two-step recursive method for solving the MBVP after the parameters and boundary conditions are partitioned according to some embodiments, such as the embodiment of FIG. 10B, where $\beta_1$ and $\beta_2$ are two sets of parameters, and $BC_1$ and $BC_2$ are two sets of boundary conditions.

As shown in FIG. 11, the method starts with the initial estimate of values of parameters 1100, which generates the estimate of the first and second sets of parameters 1108. The initial estimate of the MBVP is typically generated by qualitatively analyzing the necessary conditions, or solving an easier boundary value problem than the MBVP. A natural choice of the easier boundary value problems could be obtained from the MBVP by ignoring the segments where any constraint is violated. The block 1101 fixes the values of the second set of parameters, and outputs the estimated or updated values of parameters 1109 to the block 1102. The block 1102 solves the initial value problem of the differential equations defined in the MBVP, and outputs the solution 1110 to the block 1103.

The block 1103 checks the first set of boundary conditions. If the first set of parameters satisfies the first set of boundary conditions, then the block 1105 evaluates the second set of boundary conditions. Otherwise, the first set of parameters is updated 104. For example, the block 1104 determines a gradient 1111 of the first set of boundary conditions with respect to the first set of parameters, and updates the first set of parameters based on the gradient 1111. The gradient 1111 of the first set of boundary conditions can be determined analytically, if the sensitivity equations are linear time invariant. Otherwise, the gradient 1111 can be determined by integrating sensitivity equations, if the sensitivity equations are time variant.

If the second set of boundary conditions in block 1105 is satisfied, a block 1107 outputs the control trajectory, otherwise, the block 1106 updates the second set of parameters by various methods for solving zeros of an algebraic equation. For example, the block 1106 determines a gradient 1113 of the second set of boundary conditions with respect to the second set of parameters and updates the second set of parameters based on the gradient 1113. The first and second sets of parameters are alternately updated until the first and second sets of boundary conditions are satisfied.

As an example, assume that the structure of the solution of the MBVP includes m segments. The solution of the MBVP switches at time instants $t_k$, $1 \leq k \leq m-1$, and $t_0 = 0$ and $t_m = T$ are the initial and the final times of the task, respectively. Parameters for the kth segment are $(\beta_{k1}, \beta_{k2})$, for $1 \leq k \leq m$. Let $$\beta_1 = (\beta_{11}, \ldots, \beta_{m1}),$$

$$\beta_2 = (\beta_{12}, \ldots, \beta_{m2}),$$

where, in one embodiment, the first set of parameters $\beta_1$ includes state and costate values at time instants when the control trajectory switches, and the second set of parameters $\beta_2$ includes the parameters of switch times of the solution.

Denote $\beta = (\beta_1, \beta_2)$ the entire set of parameters. Similarly, the boundary conditions for the kth segment are denoted by $(BC_{k1}, BC_{k2})$, which correspond to two sets of parameters $\beta_{k1}$ and $\beta_{k2}$ respectively. The boundary conditions of the MBVP, denoted by BC, is the union of $(BC_{k1}, BC_{k2})$ for $1 \leq k \leq m$, as $$BC = (BC_{11}, BC_{12}, \ldots, BC_{m1}, BC_{m2}).$$

Accordingly, the boundary conditions BC can be partitioned into two sets of boundary conditions $BC_1$ and $BC_2$ corresponding to parameter sets $\beta_1$ and $\beta_2$ respectively, i.e., $$BC_1 = (BC_{11}, \ldots, BC_{m1}), \text{ and}$$

$$BC_2 = (BC_{21}, \ldots, BC_{m2}),$$

The residual values corresponding to $BC_{k1}$ and $BC_{k2}$, denoted by $F_{k1}$ and $F_{k2}$, can be obtained from the solution 1110 computed by the block 1102. Residuals correspond to $\beta_1, \beta_2$ are $$F_1 = (F_{11}, \ldots, F_{m1}), \text{ and}$$

$$F_2 = (F_{12}, \ldots, F_{m2}),$$

The mixed shooting method alternately updates two sets of parameter $\beta_1, \beta_2$ on the basis of two sets of boundary conditions $BC_1$ and $BC_2$, respectively. This is improves the convergence of the solution. The purpose of the iterative process is to determine the parameter set, $\beta^* = (\beta_1^*, \beta_2^*)$ such that $F_1(\beta_1^*) = 0, F_2(\beta_2^*) = 0$, which are a set of algebraic equations. In one embodiment, Newton's method is used to update the estimate of $\beta$ on the basis of the residuals and its gradient with respect to parameters $$\beta_1^{i+1} = \beta_1^i + \rho_1 \left( \frac{\partial F_1}{\partial \beta_1} \bigg|_{\beta_1 = \beta_1^i} \right)^{-1} F_1, \quad (14)$$

$$\beta_2^{i+1} = \beta_2^i + \rho_2 \left( \frac{\partial F_2}{\partial \beta_2} \bigg|_{\beta_2 = \beta_2^i} \right)^{-1} F_2,$$

where $\beta_k^i$, $k = \{1, 2\}$ are the estimated values of parameter sets $\beta_k$ at the i the iteration, $\rho_1, \rho_2$ are step lengths of parameter updates, and $\partial F_k / \partial \beta_k$, $k = \{1, 2\}$ are gradients of the boundary condition set $BC_k$ with respect to the parameter set $\beta_k$. Given $\partial x / \partial \beta, \partial \lambda / \partial \beta$, the computation of the gradient of $F_1, F_2$, with respect to parameters, is straightforward for those skilled in the art.

In one embodiment, the procedure to determine parameters satisfying BCs includes the computation of the gradient of BCs with respect to parameters $\beta$, which include the following components $$\frac{\partial x}{\partial \beta_1},$$

$$\frac{\partial \lambda}{\partial \beta_1},$$

$$\frac{\partial x}{\partial \beta_2},$$

$$\frac{\partial \lambda}{\partial \beta_2}.$$

The gradient of BCs with respect to parameters $\beta$ can be obtained from sensitivity equations. As an example, for the k th segment, the sensitivity equations of $x(t_k)$ w.r.t. $\lambda(t_{k-1})$ are $$\frac{d}{dt}\frac{\partial x(t)}{\partial \lambda(t_{k-1})} = (f_x + f_u u_x)\frac{\partial x}{\partial \lambda(t_{k-1})} + f_u u_\lambda \frac{\partial \lambda}{\partial \lambda(t_{k-1})}, \quad (15)$$

where $f_x$ and $f_u$ are the partial derivative of the function $f$ with respect to the state x and the control u respectively, and $u_x$, $u_\lambda$ are the partial derivative of the control u with respect to the state and the costate respectively. The sensitivity equations of $\lambda(t)$ with respect to $\lambda(t_{k-1})$ can be similarly derived. The initial conditions of sensitivity equations are straightforward for those skilled in this art and therefore omitted in this disclosure for clarity purposes.

Embodiments of the invention use various method to determine $\partial x/\partial \beta_2$, $\partial \lambda/\partial \beta_2$. In one embodiment, the second set of parameters are the switch times $t_k$, $1 \le k \le m-1$, and the embodiment determines $$\frac{\partial x(t_k^-)}{\partial t_k},$$
$$\frac{\partial x(t_{k+1}^-)}{\partial t_k},$$
$$\frac{\partial \lambda(t_k^-)}{\partial t_k},$$
$$\frac{\partial \lambda(t_{k+1}^-)}{\partial t_k}.$$

In another embodiment, the gradient of BCs with respect to $\beta_2$ is approximated as $$\frac{\partial x(t_k^-)}{\partial t_k} = f(x(t), u(t))|_{t=t_k^-},$$
$$\frac{\partial \lambda(t_k^-)}{\partial t_k} = -H_x^T(x(t), \lambda(t), \mu(t), v(t))|_{t=t_k^-},$$
$$\frac{\partial x(t_{k+1}^-)}{\partial t_k} = -f(x(t), u(t))|_{t=t_{k+1}^-},$$

and $$\frac{\partial \lambda(t_{k+1}^-)}{\partial t_k} = H_x^T(x(t), \lambda(t), \mu(t), v(t))|_{t=t_{k+1}^-}.$$

where $H_x^T$ is the transpose of the partial derivative of the Hamiltonian operator with respective to the state.

Compared to the multiple shooting method, the mixed shooting method reduces the number of parameters to reduce processing time. Compared to the single shooting method, the mixed shooting method improves the convergence property of the solver by incorporating the structure of the optimal trajectory as an a priori condition. To remedy the convergence problem in single shooting method, the two-step recursion is used by some embodiments to decouple the effects of different sets of parameters on the boundary conditions.

Figure 12:
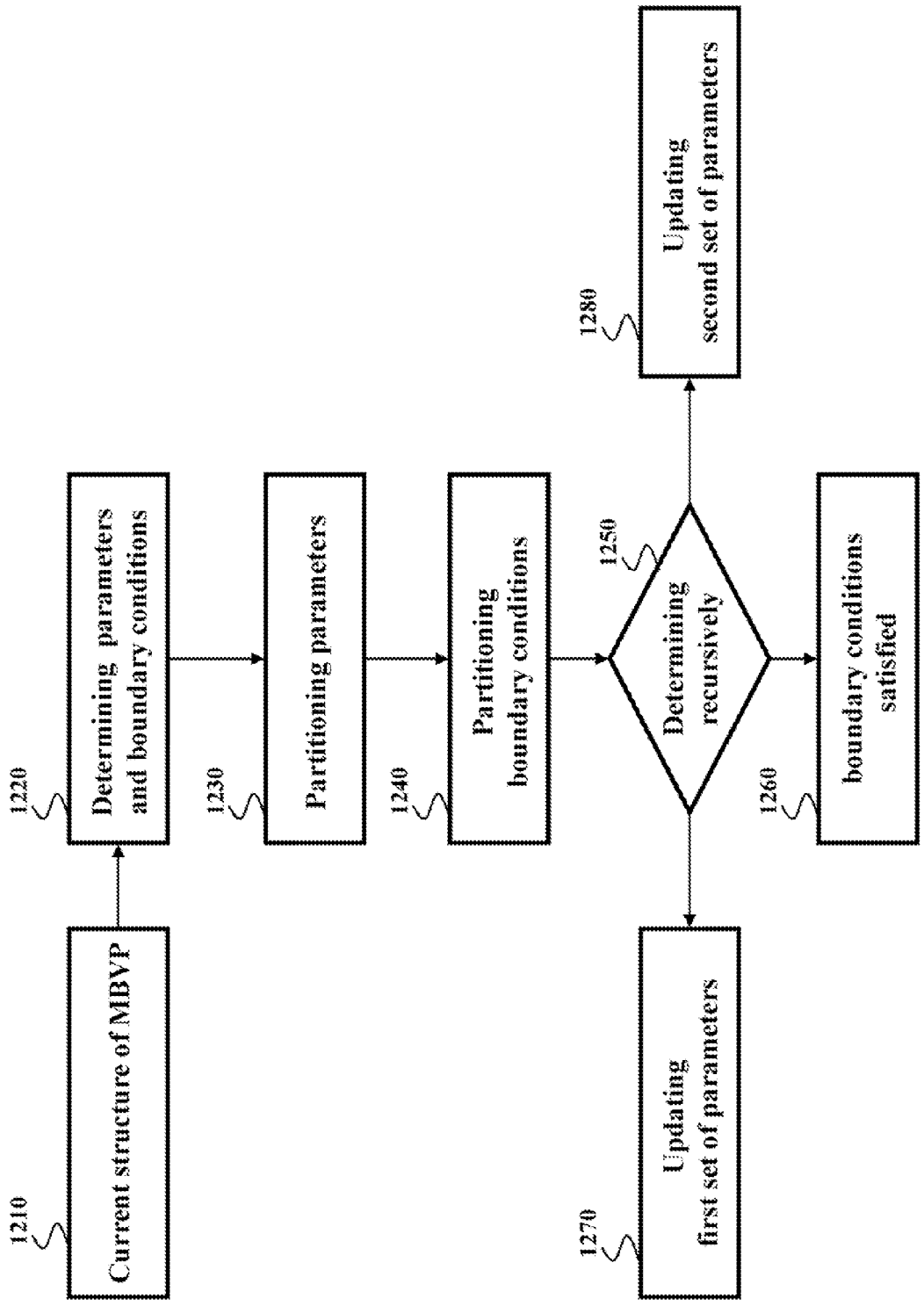
FIG. 12 is a block diagram of a method for solving the MBVP according to some embodiments of an invention.

FIG. 12 shows a block diagram of a method for solving the current MBVP using the mixed shooting method. The parameters and boundary conditions of the current MBVP are determined 1220 based on a current structure 1210 of the current MBVP. The current structure can be determined, e.g., according to a method described in relation with FIG. 8. The parameters are partitioned 1230 into a first set of parameters and a second set of parameters. Similarly, the boundary conditions are partitioned 1240 into a first set of boundary conditions corresponding to the first set of parameters and a second set of boundary conditions corresponding to the second set of parameters. Next, the method determines recursively 1250 values of the first set of parameters based on fixed values of the second set of parameters, and values of the second set of parameters based on fixed values of the first set of parameters.

For example, an iteration of the recursion 1250 updates 1270 values of the first set of parameters until the first set of boundary conditions is satisfied, and updates 1280 values of the second set of parameters to satisfy the second set of boundary conditions. The iterations are repeated recursively until both the first and the second sets of boundary conditions are satisfied 1260. In one embodiment, the first set of parameters includes state and costate values of the current control trajectory and the second set of parameters includes switching times of the current control trajectory.

Trajectory Planning for an Energy Efficient Motion Control System

Some embodiments of the invention are motivated by the need of an effective trade-off between the energy consumption and the productivity of the motion control system, such that the overall cost of the operations of the motion control system is reduced. Among various factors, an energy efficient trajectory that a servo motor follows to reduce the energy consumption of the motion control system is determined. Furthermore, the energy efficient trajectory considers various constraints of the motion control system including velocity, acceleration, and current constraints. Various embodiments of the invention determine the energy efficient trajectory of the energy efficient motion control system as an optimal control problem, which can be formulated as a class of MBVPs, and solve the MBVPs using the mixed shooting method.

For example, piecewise differential equations of MBVPs are defined as the combination of Equations (2), (7), (5), and (6). As described above, the optimal control trajectory may include various segments, and its structure depends on problem data such as T, r, $\alpha_{max}$, $v_{max}$. Different structures correspond to distinctive MBVPs.

The use of the mixed shooting method to determine the energy efficient trajectory is illustrated by solving the MBVP corresponding to the following problem data (PDATA), PDATA$_1$: $T=0.608$ s,$r=164$ m,$v_{max}=314.1$ m/s, $\alpha_{max}=3620$ m/s$^2$,$u_{max}=8$ A,$d=-3.8258$ Ns/m,$c=-241.2879$ N,$b=1031.4$ N/A, where $u_{max}$ is the maximum of the input current of the motor. The structure of the solution associated with the problem data PDATA$_1$ can be determined, e.g., based on the method shown in FIG. 8. For example, the control trajectory may include following segments sequentially: a positive acceleration constrained segment; a unconstrained positive control segment; a velocity constrained segment; an unconstrained positive control segment; a zero control segment; an unconstrained negative control segment; an negative acceleration constrained segment.

Given the structure of the optimal control trajectory and following the definition of parameters and boundary conditions of the mixed shooting method, one embodiment defines parameters for the k th segment for $1 \le k \le 7$, $$(\beta_{k1}, \beta_{k2}) = \begin{cases} (\lambda_0, t_1)^T, & k=1, \\ (x(t_k), \lambda(t_k), t_{k+1})^T, & 2 \le k \le 6, \\ (x(t_6), \lambda(t_6))^T, & k=7, \end{cases} \quad (16)$$

and the first and second sets of parameter as $\beta_1 = (\lambda_0, x(t_1), \lambda(t_1), \ldots, x(t_6), \lambda(t_6)),$ $\beta_2(t_1, \ldots, t_6) \in R^6.$ BCs for the k th segment, $1 \leq k \leq 7$, are
BC$_1$: corresponds to state and costate parameterset $$\phi_x(x(t_{k-1}),\lambda(t_{k-1}),t_{k-1},t_k)=x(t_k^+), 1 \leq k \leq 6$$

$$\phi_\lambda(x(t_{k-1}),\lambda(t_{k-1}),t_{k-1},t_k)=\lambda(t_k^+), k \neq 2, 1 \leq k \leq 6$$

$$x_2(t_2^-)=v_{max},$$

$$\lambda_1(t_2^-)=\lambda_1(t_2^+),$$

$$\phi_x(x(t_6^+),\lambda(t_6^+),t_6,T)=x_f, k=7$$

BC$_2$: corresponds to the switch time parameter set $$u(t_k^-)=u(t_k^+), 1 \leq k \leq 6,$$

where $\phi_x(\cdot)$ and $\phi_\lambda(\cdot)$ are the state and costate trajectory, and $x(t_0)=x_0, \lambda(t_0)=\lambda_0$. The MBVP has 30 parameters and BCs. Alternatively, the number of parameters can be reduced by removing the costate at the entry of constrained segments. Thus, the parameter sets and boundary conditions can be simplified.

The sensitivity equations are to be defined to compute the gradient of BCs with respect to $\beta_1$ and $\beta_2$, i.e., $$\frac{\partial x}{\partial \beta_1},$$

$$\frac{\partial \lambda}{\partial \beta_1},$$

$$\frac{\partial x}{\partial \beta_2},$$

$$\frac{\partial \lambda}{\partial \beta_2}.$$

The sensitivity equations corresponding to Equation (16) are summarized as follows $$\frac{d}{dt}\frac{\partial x_a}{\partial \beta_1} = A_a \frac{\partial x_a}{\partial \beta_1}, \quad (17)$$

where $x_a = [x, \lambda]$, and $$A_a = \begin{bmatrix} \alpha_1 I_{48} & \alpha_2 I_{48} \\ \alpha_3 I_{48} & \alpha_4 I_{48} \end{bmatrix},$$

$$\frac{\partial x_a}{\partial \beta_1} = \begin{bmatrix} \frac{\partial x}{\partial \beta_1} & \frac{\partial \lambda}{\partial \beta_1} \end{bmatrix} \in R^{96},$$

$$\alpha_1 = f_x + f_u u_x,$$

$$\alpha_2 = f_u u_\lambda,$$

$$\alpha_3 = -H_{xx}^T - H_{xu}^T u_x - H_{x\mu}^T(\mu_x + \mu_u u_x) - H_{xv}^T(v_x + v_u u_x),$$

$$\alpha_4 = -H_{x\lambda}^T - H_{xu}^T u_\lambda - H_{x\mu}^T(\mu_\lambda + \mu_u u_\lambda) - H_{xv}^T(v_\lambda + v_u u_\lambda).$$

The functions $f_x$, $f_u$, $u_x$, $u_\lambda$, $H_{xx}^T$, $H_{xu}^T$, $H_{xx}^T$, $H_{x\mu}^T$, $H_{xv}^T$, $\mu_x, \mu_\lambda, \mu_u, v_x, v_\lambda, v_u$ can be readily derived from the dynamic constraints and necessary conditions by those skilled in the art. Thus $\alpha_1, \ldots, \alpha_4$ can be computed from x and $\lambda$. The sensitivity of BC$_2$ with respect to switch times can be readily computed as well.

Given the definitions and partitions of parameters and boundary conditions, and the sensitivity equations, the two-step method of FIG. 11 is used to determine the solution of the MBVP associated with the problem data PDATA$_1$.

Figure 13:
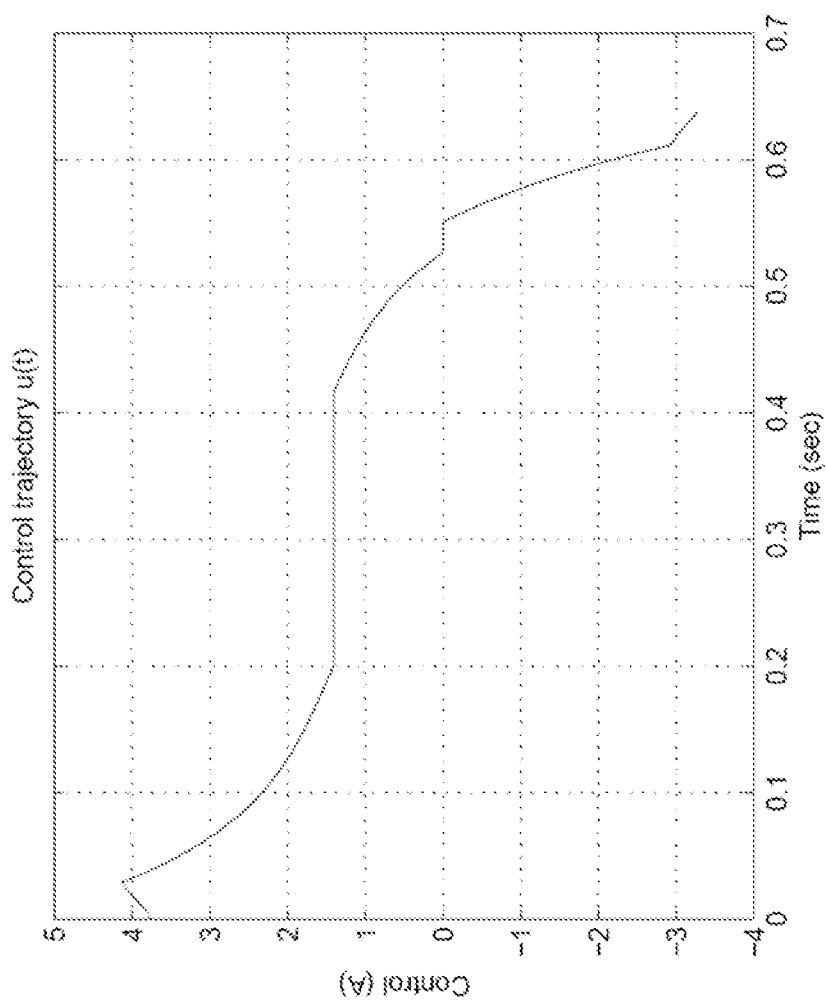
FIGS. 13 and 14 are graphs of an optimal control trajectory of the MBVP associated with specific problem data according to some embodiments of an invention.
Figure 14:
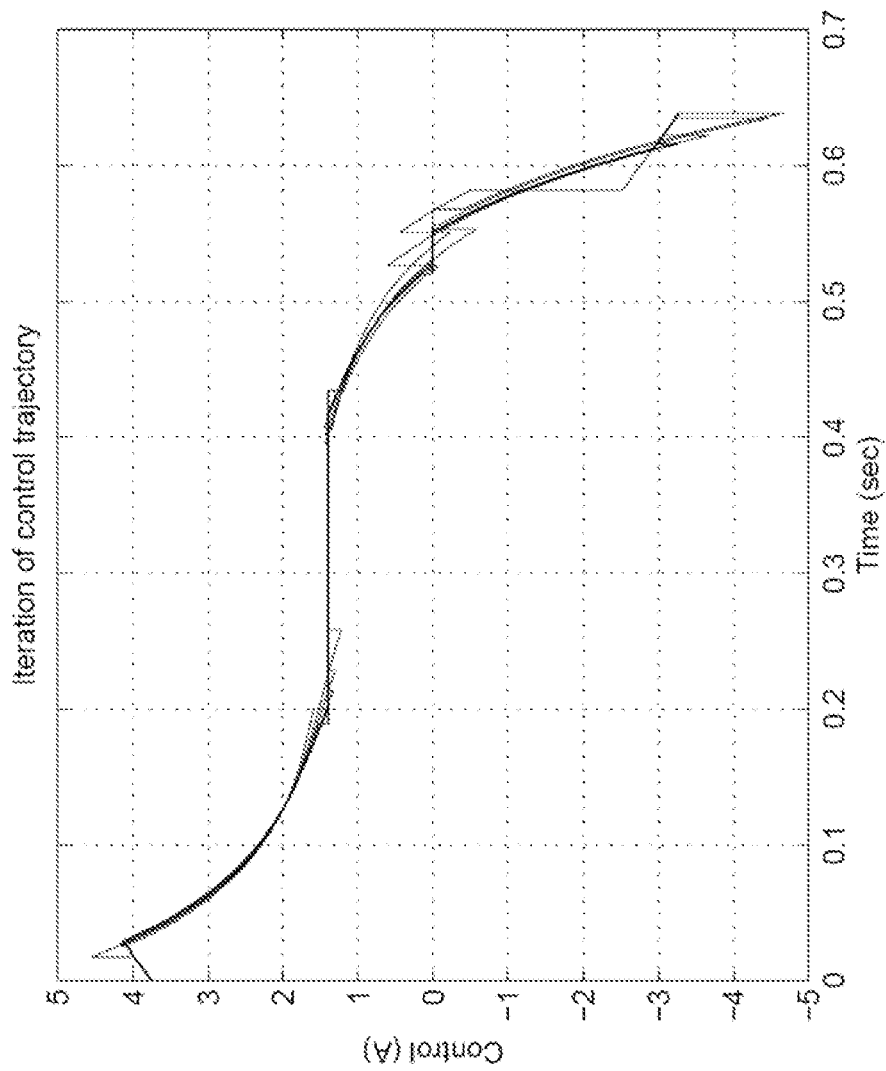

The optimal control trajectory is shown in FIG. 13. The iteration of updating $\beta_2$ is shown in FIG. 14, where the iteration is illustrated by the control trajectory during each iteration of $\beta_2$.

Additionally, one embodiment uses the mixed shooting method to solve the trajectory of an energy efficient motion control system which minimizes the following cost function $$E=\int_0^T \max(0, Ru^2+K_s|u|+K_\tau x_2 u)dt.$$

wherein E is the energy consumption of the system, u is a control input to the motor, R is a resistance of windings of the motor, $x_2$ is a second component of the state of the motor x representing an angular velocity of the motor, $K_s$ is a constant coefficient of the switching loss at an amplifier, and $K_\tau$ is a torque constant of the motor. In some embodiments, the switching loss is not considered, e.g., $K_s=0$.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Further, it should be appreciated that a computer may be embodied in any of a number of forms, such as a rack-mounted computer, a desktop computer, a laptop computer, minicomputer, or a tablet computer. Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the invention may be embodied as a computer readable storage medium or multiple computer readable media, e.g., a computer memory, compact discs (CD), optical discs, digital video disks (DVD), magnetic tapes, and flash memories. Alternatively or additionally, the invention may be embodied as a computer readable medium other than a computer-readable storage medium, such as a propagating signal.

The tennis "program" or "software" are used herein in a generic sense to refer to any type of computer code or set of computer-executable instructions that can be employed to program a computer or other processor to implement various aspects of the present invention as discussed above.

Computer-executable instructions may be in many forms, such as program modules, executed by one or more computers or other devices. Generally, program modules include routines, programs, objects, components, data structures that perform particular tasks or implement particular abstract data types. Typically the functionality of the program modules may be combined or distributed as desired in various embodiments.

Also, the embodiments of the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A method for controlling an operation of a motion control system including a motor according to a control trajectory represented by a solution of a set of differential equations satisfying boundary conditions, wherein the set of differential equations includes ordered piecewise differential equations, comprising:
   parameterizing the set of differential equations to produce a first set of parameters representing values of the solution at switching times and a second set of parameters representing values of the switching times;
   determining alternately values of the first and the second sets of parameters until the boundary conditions are satisfied to produce the solution that optimizes a cost function representing energy consumption of the system during the operation;
   generating the control trajectory based on the solution; and
   controlling the operation of the system by using the motor to track the control trajectory,
   wherein steps of the method are performed by a processor of a motion controller.

2. The method of claim 1, wherein the determining alternately comprises:
   determining values of the first set of parameters satisfying a first set of boundary conditions by solving the set of differential equations having the values of the second set of parameters fixed;
   determining the values of the second set of parameters satisfying a second set of boundary conditions by solving the set of differential equations having the values of the first set of parameters fixed; and
   repeating the determining values of the first and the second set of parameters until both the first and the second sets of boundary conditions are satisfied to produce the control trajectory.

3. The method of claim 2, further comprising:
   initializing the first and the second sets of parameters;
   updating iteratively the values of the first set of parameters by solving initial value problems until the first set of boundary conditions is satisfied; and
   updating the values of the second set of parameters based on the updated values of the first set of parameters and the second set of boundary conditions.

4. The method of claim 3, further comprising:
   partitioning the boundary conditions into the first set of boundary conditions corresponding to the first set of parameters and the second set of boundary conditions corresponding to the second set of parameters.

5. The method of claim 4, further comprising:
   determining the first set of boundary conditions based on continuity of the state and costate of the system at the switching times.

6. The method of claim 1, wherein the operation of the system is subject to constraints, wherein the values of the first set of parameters represent state and costate of the system, and wherein the set of differential equations and the boundary conditions form a multi-boundary value problem (MBVP) having the solution satisfying the constraints and optimizing the cost function representing energy consumption of the system during the operation.

7. The method of claim 6, wherein the cost function is an integral $$E = \int_0^T \max(0, P(x(t), u(t)))\,dt,$$

wherein E is the energy consumption of the system during time of the operation T, $P(x, u)$ is an instantaneous energy consumption of the system, x is a state of the motor, u is a control input to the motor, wherein the instantaneous energy consumption P results from at least one of a copper loss of the resistance windings of the motor, a switching loss of an amplifier, and a mechanical work of the motor.

8. The method of claim 6, further comprising:
determining the MBVP based on a Hamiltonian analyses of the cost function and constraints of the operation of the system, wherein the constraints includes one or combination of an acceleration constraint of a motor, a velocity constraint of the motor, an input current constraint of the motor, a dynamic constraint of the motor, the tracking time, an initial state of the motor, and a final state of the motor.

9. The method of claim 6, wherein the cost function is $$E = \int_0^T \max(0, P(x(t), u(t)))\,dt,$$

wherein E is the energy consumption of the system during time of the operation T, u is a control input to the motor, R is a resistance of windings of the motor, $x_2$ is a second component of the state of the motor x representing an angular velocity of the motor, $K_s$ is a constant coefficient of the switching loss at an amplifier, and $K_r$ is a torque constant of the motor.

10. The method of claim 9, further comprising:
determining the MBVP based on a Hamiltonian analyses of the cost function and constraints of the operation of the system, such that the MBVP is a linear time invariant MBVP;
initializing the first and the second sets of parameters;
updating iteratively the values of the first set of parameters by solving initial value problems analytically until the first set of boundary conditions is satisfied; and
updating the values of the second set of parameters based on the updated values of the first set of parameters and the second set of boundary conditions.

11. The method of claim 6, further comprising
determining a set of MBVPs based on a Hamiltonian analyses of the cost function and constraints of the operation of the system;
selecting the MBVP from the set of MBVPs; and
assigning the solution of the MBVP to represent the control trajectory, if the solution satisfies the constraints; and otherwise
repeating the selecting and the assigning until the solution satisfies the constraints.

12. The method of claim 11, wherein an order of the selecting the MBVP is based on a complexity of a structure of the MBVP.

13. A method for controlling an operation of a motion control system including a motor based on solving a multi-boundary value problem (MBVP) formed by a set of differential equations satisfying boundary conditions, wherein the set of differential equations includes ordered piecewise differential equations, and wherein a solution of the MBVP represents a control trajectory of the operation, comprising:
parameterizing the set of differential equations to produce a first set of parameters representing values of the solution at switching times and a second set of parameters representing values of the switching times;
determining values of the first set of parameters satisfying a first set of boundary conditions by solving the set of differential equations having the values of the second set of parameters fixed;
determining the values of the second set of parameters satisfying a second set of boundary conditions by solving the set of differential equations having the values of the first set of parameters fixed;
repeating the determining values of the first and the second set of parameters until both the first and the second sets of boundary conditions are satisfied to produce the control trajectory that optimizes a cost function representing energy consumption of the system during the operation; and
controlling the operation of the system by using the motor to track the control trajectory, wherein steps of the method are performed by a processor of a motion controller.

14. The method of claim 13, further comprising:
initializing the first and the second sets of parameters;
partitioning the boundary conditions into the first set of boundary conditions corresponding to the first set of parameters and the second set of boundary conditions corresponding to the second set of parameters;
updating iteratively the values of the first set of parameters by solving initial value problems until the first set of boundary conditions is satisfied; and
updating the values of the second set of parameters based on the updated values of the first set of parameters and the second set of boundary conditions.

15. The method of claim 14, further comprising:
repeating recursively the updating values of the first and the second set of parameters until both the first and the second sets of boundary conditions are satisfied.

16. The method of claim 14, wherein the initial value problems is solved analytically.

17. A motion controller for controlling an operation of a system based on a control signal, comprising:
a processor configured to execute a trajectory generation module,
a control module,
and a motor to control the operation of the system by tracking the control signal,
wherein the trajectory generation module determines a control trajectory by solving a multi-boundary value problem (MBVP) using a mixed shooting method,
wherein the trajectory generation module initializes a first set of parameters representing values of the control trajectory at switching times and a second set of parameters representing values of the switching times, and updates alternately the first and the second sets of parameters until the first set and the second set of boundary conditions are satisfied and a cost function representing energy consumption of the system during the operation is optimized, and
wherein the control module generates the control signal based on the control trajectory.

18. The system of claim 17, wherein the operation of the system is subject to constraints, wherein the values of the first set of parameters represent state and costate of the system, and wherein a solution to MBVP optimizes the cost function representing energy consumption of the system during the operation.

19. The system of claim 18, wherein the system includes a motor, wherein the cost function is an integral $$E = \int_0^T \max(0, P(x(t), u(t)) dt,$$

wherein E is the energy consumption of the system during time of the operation T, P(x, u) is an instantaneous energy consumption of the system, x is a state of the motor, u is a control input to the motor, wherein the instantaneous energy consumption P results from at least a copper loss of resistance windings of the motor and a mechanical work of the motor.

* * * * *